(12) United States Patent
Wadia et al.

(10) Patent No.: US 6,725,645 B1
(45) Date of Patent: Apr. 27, 2004

(54) TURBOFAN ENGINE INTERNAL ANTI-ICE DEVICE

(75) Inventors: Aspi R. Wadia, Loveland, OH (US); Raymond G. Holm, Lebanon, OH (US)

(73) Assignee: General Electric Company, Schnectady, NY (US)

( * ) Notice: Subject to any disclaimer, the term of this patent is extended or adjusted under 35 U.S.C. 154(b) by 0 days.

(21) Appl. No.: 10/264,128

(22) Filed: Oct. 3, 2002

(51) Int. Cl.[7] ................................................. F02K 3/02
(52) U.S. Cl. ...................................... 60/226.1; 29/890.1
(58) Field of Search ........................ 60/226.1; 29/890.01

(56) References Cited

U.S. PATENT DOCUMENTS

| | | | | |
|---|---|---|---|---|
| 3,967,996 A | * | 7/1976 | Kamov et al. ............... 156/156 |
| 4,550,564 A | * | 11/1985 | Callahan et al. ......... 60/39.093 |
| 4,782,658 A | * | 11/1988 | Perry ......................... 60/226.1 |
| 4,821,758 A | * | 4/1989 | Ruis ........................... 137/15.1 |
| 5,281,091 A | * | 1/1994 | Dooley et al. .............. 415/178 |
| 6,561,760 B2 | * | 5/2003 | Wadia et al. ................ 415/145 |

* cited by examiner

*Primary Examiner*—Ehud Gartenberg
(74) *Attorney, Agent, or Firm*—Nathan Herkamp; Barbara Joan Haushalter

(57) ABSTRACT

A system and method are provided for preventing the formation of ice on or removing ice from an internal surface of a turbofan engine. A splitter region, associated with a booster compressor of the turbofan engine, is identified. The splitter region has surfaces internal to the turbofan engine subject to inlet icing conditions. A resin is molded along a leading edge of the splitter region, and electric coils are installed within the resin to prevent ice build-up on the splitter region or to remove ice from the splitter region during icing conditions.

20 Claims, 2 Drawing Sheets

TURBOFAN ENGINE INTERNAL ANTI-ICE DEVICE

BACKGROUND OF THE INVENTION

The present invention relates to gas turbine engines, and, more specifically, to the deicing therein.

During flight and/or while grounded, aircraft may encounter atmospheric conditions that cause the formation of ice on airfoils and other surfaces of the aircraft. If accumulating ice is not removed, it can change the aerodynamic profiles of the components being iced, adversely affecting the aerodynamic performance of the engine. Hence, aircraft engines are required to demonstrate the ability to operate in an icing environment to show compliance with Federal Aviation Administration requirements.

Ice accumulation has conventionally been accommodated by configuring affected compressor airfoils with an increase in ruggedness to avoid or minimize problems caused by ice liberation. Commercial engines have been able to alleviate operability issues caused by ice accumulation by raising flight idle or ground idle speeds without violating thrust constraints. However, as technology drives commercial engines to achieve higher and higher bypass ratios, some of the operability issues are becoming more severe than encountered in the past, since more engine airflow will correspondingly increase the amount of ice accumulation which must be accommodated.

Furthermore, ever larger fan blades that operate at slower rotational speeds are being designed with state of the art composite materials. Slow fan speeds can permit more accumulation of ice in certain icing conditions.

One way of reducing the ice accumulation on booster airfoils is to provide heat to the inlet guide vanes (IGVs), as is disclosed in commonly assigned, co-pending U.S. application Ser. No. 09/932595. Hot air from the high pressure compressor could be allowed to flow through hollow IGVs. However, hollow IGVs tend to have an increased thickness. While the anti-ice system of such a configuration works well, there can be some performance loss with the thicker, hollow IGVs.

An alternative to circulating air through the inlet guide vanes is to use compressor bleed air channeled through the manifold and out the splitter nose for de-icing, as was also disclosed in commonly assigned, co-pending U.S. application Ser. No. 09/932595. However, the amount of bleed compressor air used to de-ice the booster splitter leading edge is considered to be a heretofore necessary performance loss to the engine cycle. This loss is a result of the work done to the ambient air by the compressor to pressurize it and thereby melt ice off the splitter nose, which work is not then used by the turbomachinery components to produce thrust.

It would be desirable, therefore, to provide an anti-icing technique that effectively reduces ice threat to aircraft without increasing aerodynamic total pressure losses due to the increased thickness of hollow IGVs.

BRIEF SUMMARY OF THE INVENTION

The present invention reduces ice threat to the internal surfaces of aircraft engines, eliminating both the need for hollow inlet guide vanes and/or the use of an internal heavy and complex piping system to deice the booster splitter leading edge surfaces. The present invention has the additional advantage of eliminating the need to use compressor air, with the associated performance penalty of such air use, and bulky valves with their added system weight. The present invention uses electric coils meshed into the booster splitter lip near the leading edge in a conventional turbofan engine, to reduce ice accumulation on surfaces internal to the engine.

Accordingly, the present invention provides a system and method for preventing the formation of ice on or removing ice from an internal surface of an aircraft engine.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
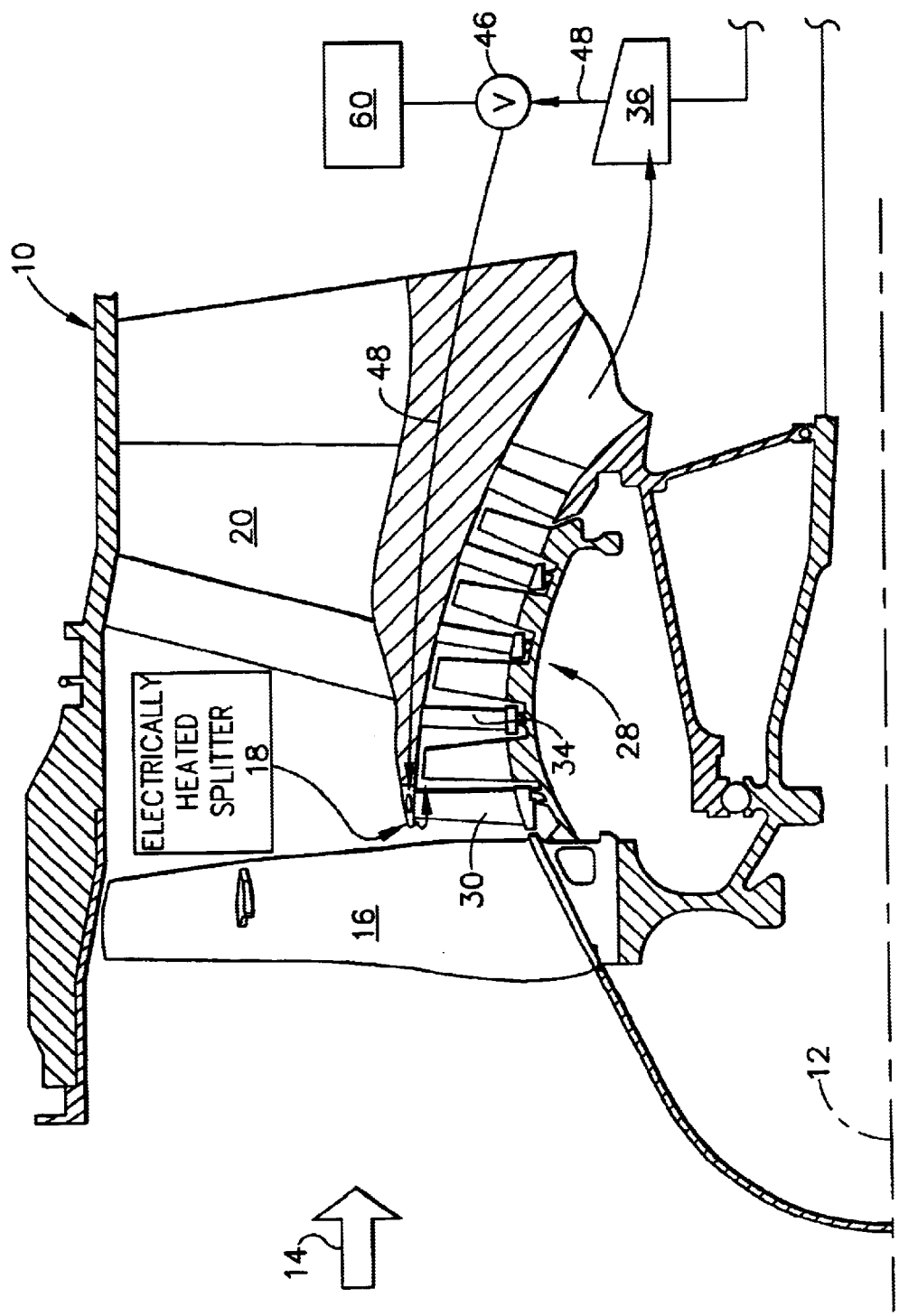
FIG. 1 is an axial sectional view through a portion of a high bypass turbofan gas turbine engine for powering an aircraft in flight.

Referring to FIG. 1, there is illustrated a portion of a high bypass turbofan gas turbine engine 10 configured for powering an aircraft (not shown) in flight from takeoff, cruise at altitude, descent, and landing, within a corresponding flight envelope of operation. The engine is axisymmetrical about a longitudinal or axial centerline axis 12 and includes an inlet at its forward end for receiving ambient air 14. The ambient air 14 first engages a row of fan rotor blades 16. Air discharged from the fan blades is split concentrically by an annular splitter nose 18 for separate flow through an annular bypass duct 20 surrounding the splitter, and low pressure or booster compressor 22 disposed inside the splitter.

The basic engine configuration illustrated in FIG. 1 is conventional, and but for the present invention, has been used in commercial service in this country for many years. The bypass duct 20 is surrounded by a conventional nacelle, shown in part, and supported by rows of struts and bypass outlet guide vanes.

In an exemplary embodiment, a heating means such as electric heaters 22 can be used in place of bleed compressor anti-ice air 48 as the deicer for surfaces internal to the turbofan engine. Specifically, electric coils 24 are proposed to avoid ice buildup in the splitter surfaces. The electric coils can be installed within a resin 26 that is molded essentially into the shape of the leading edge of the splitter.

The booster compressor 28 includes a row of inlet guide vanes (IGVs) 30 which, in conventional configurations, first receive the inner portion of the air discharged from the fan blades for entry in the compressor. With the configuration of the present invention, the need for hollow and, therefore, thicker IGVs as well as the use of compressor air to melt the ice from the IGV surface or the booster splitter leading edge is eliminated, and electric heaters are used to avoid ice buildup on the splitter surfaces without a consequent aerodynamic performance penalty.

Figure 2:
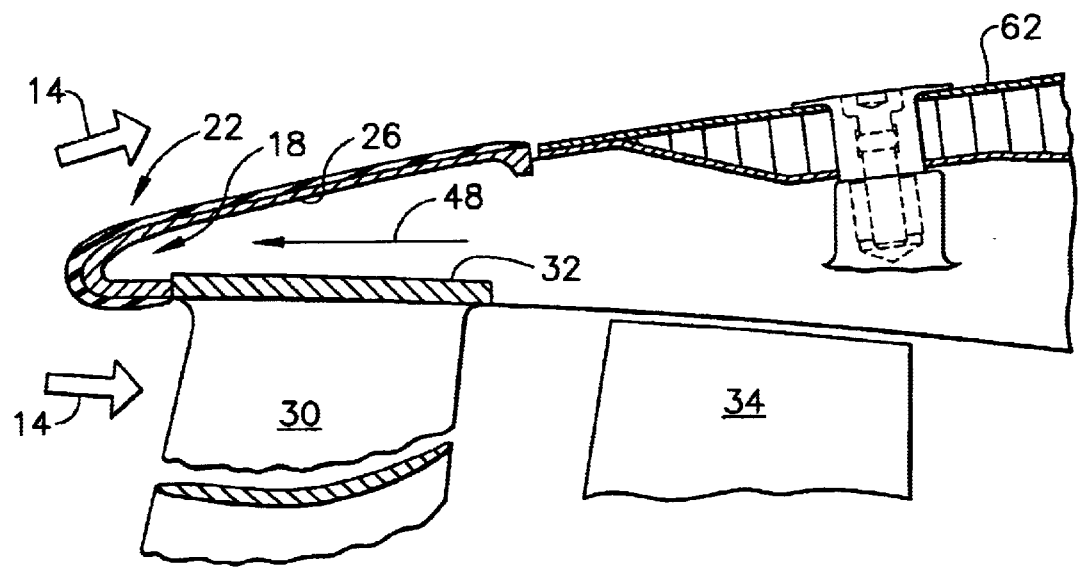
FIG. 2 is an enlarged, axial sectional view through the splitter between the booster compressor and fan bypass duct illustrated in FIG. 1, showing heating coils wrapped around the splitter nose as the deicer system according to the present invention.

FIG. 2 illustrates in more particularity a portion of the booster compressor at the splitter nose 18. A splitter shell 34 is integrally formed with the splitter nose 18 in a unitary member which defines the cooperating shroud 32 and annular manifold 36. The IGVs 30 are preferably fixedly mounted to and supported from the surrounding annular shroud 32, which vanes are not adjustable in this exemplary embodiment. The radially inner ends of the row of IGVs are suitably mounted in an inner band, as shown in FIG. 1. The electric coils 24 are placed to essentially follow the configuration of the splitter, to melt any ice formations on the splitter. The channeling of the hot air can be through a controller 60, with a valve 46 for bleeding the hot air 48 to the splitter region.

The splitter nose 18 and leading edges of the IGVs 30 are subject to icing from moisture carried with the fan air 14 during certain icing conditions in the flight envelope. Typically, icing conditions occur at altitudes below 24,000 feet with air temperature below freezing. In such operating conditions, ice may form and accumulate on the splitter nose and IGVs, but for the introduction of the present invention.

Figure 3:
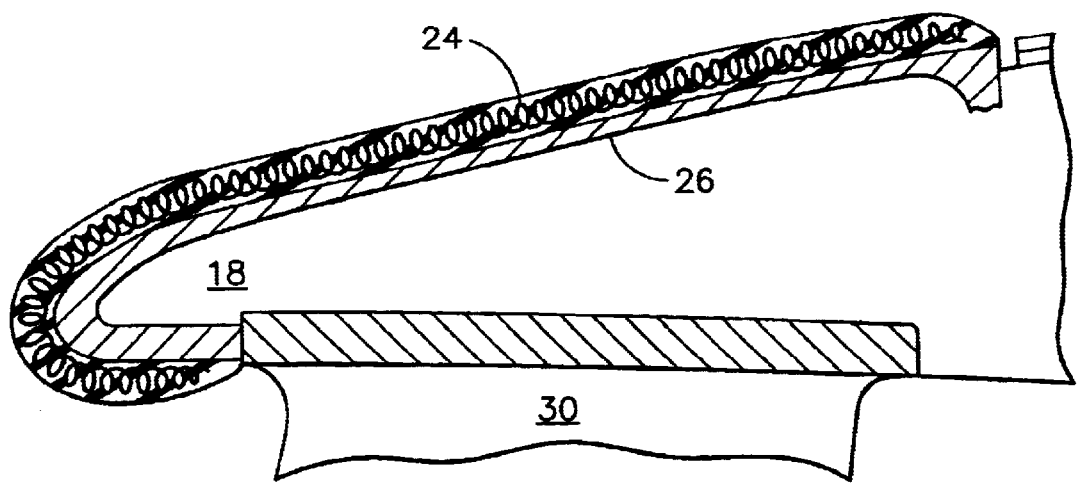
FIG. 3 is an enlarged portion of the splitter nose illustrated in FIG. 2, showing the heating coils wrapped around the splitter nose.

More specifically, an anti-icing system and method is introduced into the splitter region of the booster compressor for reducing, eliminating, or preventing the accumulation or formation of ice during icing conditions within the flight envelope of the engine. As shown in FIGS. 2 and 3, a resin 26 is molded along the defined leading edge of the splitter nose 18. In a typical embodiment, the booster splitter lip is three-dimensional with compound curved surfaces to meet aerodynamic requirements. In accordance with a preferred embodiment of the present invention, a commercially available high temperature epoxy resin hybrid enforcement system with a non-metallic honeycomb is used. Molding is via conventional hand-lay-up techniques in clean room conditions, followed by autoclave curing. The resin filler/hardener system, which is developed from commercially available materials, produces high temperature operational properties. Resin impregnated fabric, commonly known as prepreg, is commercially manufactured using a special solventless process which provides complete control of resin formulation, prepreg manufacture, and storage management. Ceramic fibers in the lay-up can provide the ability to meet fire barrier requirements. Hence, the resin is capable of withstanding the necessary heat generated by the electric coils.

In the event of malfunction of the control valve 46, the hot bleed air will not damage the splitter assembly, as the splitter shell and nose may be formed of a suitable metal for withstanding the intended temperature of the hot bleed air. The typical acoustic liner or skin 62 disposed aft from the splitter shell 34 is protected from the hot temperature of the bleed air by physical separation therefrom.

Electric coils 24 are installed within the resin 26 to prevent ice buildup on the splitter. The electric heater can be developed from a stamped sheet of resistance alloy profiled to provide controlled area heating. A sandwich, with molded rubber on each side, protects the heating element and ensures bonding to the metal splitter lip. The integrated ice protection system incorporates electronic control and composite structures with integral heaters. The anti-icing system provides continuous heating at a controlled temperature, which prevents ice formation, particularly at the splitter lip susceptible to ice formation from engine ice ingestion. The heater elements are powered by the aircraft's auxiliary power unit. The melted ice flows through the booster as liquid water or steam, depending on the temperature of the engine. The coils 24 can be controlled to provide either continuous heating for anti-icing or intermittent heating for de-icing at controlled temperatures to the splitter nose region 18. The temperature range provided by the heating coils varies and is dependent on the inlet airflow and the engine bypass ratio. Icing severity will vary with airspeed and inlet temperature, so the controlled temperature of the electric coils 24 can vary between 15 and 150 degrees Fahrenheit to provide the necessary anti-icing or de-icing capability, in accordance with the present invention.

A particular advantage of this anti-icing and deicing system and method is that the IGVs 30 may remain aerodynamically thin and solid, without the need for channeling hot bleed air radially therethrough. Hence, maximum aerodynamic efficiency of the IGVs 24 may be obtained by optimizing their aerodynamic configuration, which typically requires a relatively thin profile or thickness. The thin profile of the IGVs is not possible if internal passages are provided within the IGVs for anti-icing purposes. In addition, no bleed compressor air is required to melt ice off the booster splitter or IGV surfaces, enhancing performance of the engine.

While the invention has been described with reference to preferred and exemplary embodiments, it will be understood by those skilled in the art that various changes may be made and equivalents may be substituted for elements thereof without departing from the scope of the invention. Therefore, it is intended that the invention not be limited to the particular embodiment disclosed as the best mode contemplated for carrying out this invention, but that the invention desired to be secured will include all embodiments and modifications as fall within the true spirit and scope of the appended claims.

What is claimed is:

1. A system for preventing the formation of ice on or removing ice from an internal surface of a turbofan engine, comprising:
    a splitter region associated with a booster compressor of the turbofan engine, the splitter region having surfaces internal to the turbofan engine subject to inlet icing conditions;
    a resin molded along a leading edge of the splitter region; and
    a heating means installed within the resin to prevent ice build-up on the splitter region or to remove ice from the splitter region during icing conditions.

2. A system as claimed in claim 1 wherein the heating means comprises a plurality of electric coils.

3. A system as claimed in claim 2 wherein the plurality of electric coils are placed to approximately follow a configuration of the splitter region.

4. A system as claimed in claim 1 wherein the heating means can be developed from a stamped sheet of resistance alloy profiled to provide controlled area heating.

5. A system as claimed in claim 1 wherein the heating means is sandwiched in molded rubber.

6. A system as claimed in claim 1 wherein the heating means provides continuous heating at controlled temperatures.

7. A system as claimed in claim 1 wherein the heating means provides intermittent heating at controlled temperatures.

8. A system as claimed in claim 1 wherein the heating means is powered by an auxiliary power unit.

9. A system as claimed in claim 1 wherein the resin comprises a high temperature epoxy resin.

10. A system as claimed in claim 1 wherein the resin is molded using hand-lay-up techniques in clean room conditions followed by autoclave curing.

11. A system as claimed in claim 10 wherein the lay-up can include ceramic fibers for fire barrier capability.

12. A system as claimed in claim 1 wherein the resin comprises a resin impregnated fabric.

13. A method of preventing formation of ice on or removing ice from an internal surface of a turbofan engine, comprising the steps of:

identifying a splitter region associated with a booster compressor of the turbofan engine, the splitter region having surfaces internal to the turbofan engine subject to inlet icing conditions;

molding a resin along a leading edge of the splitter region; and installing a heating means within the resin to prevent ice build-up on the splitter region or to remove ice from the splitter region during icing conditions.

14. A method as claimed in claim 13 wherein the step of installing heating means comprises the step of installing a plurality of electric coils.

15. A method as claimed in claim 14 wherein the step of installing a plurality of electric coils further comprises the step of placing the plurality of electric coils to approximately follow a configuration of the splitter region.

16. A method as claimed in claim 13 wherein the heating means provides continuous heating at controlled temperatures.

17. A method as claimed in claim 13 wherein the heating means provides intermittent heating at controlled temperatures.

18. A method as claimed in claim 13 wherein the heating means is powered by an auxiliary power unit.

19. A method as claimed in claim 13 wherein the resin comprises a high temperature epoxy resin.

20. A method as claimed in claim 13 wherein the step of molding a resin further comprises the step of molding the resin using hand-lay-up techniques in clean room conditions followed by autoclave curing.

* * * * *